Aug. 8, 1944.  B. G. OLVING  2,355,175
ELECTRIC MOTOR
Filed Aug. 21, 1942  2 Sheets-Sheet 1
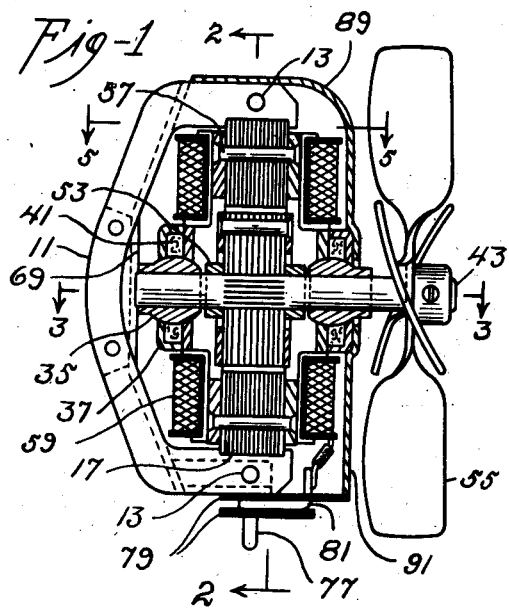
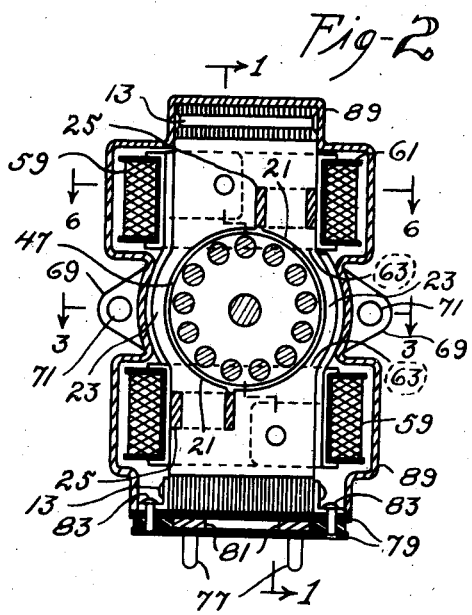
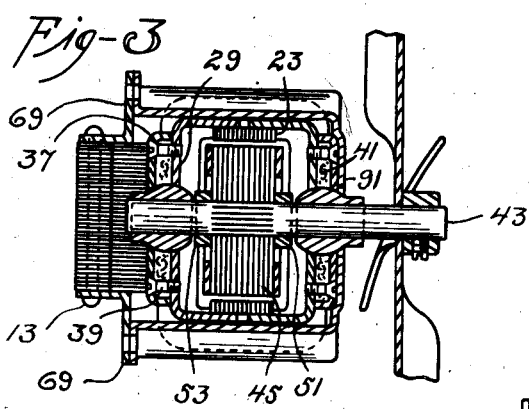
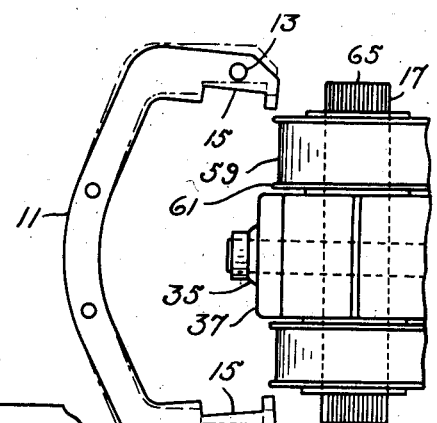
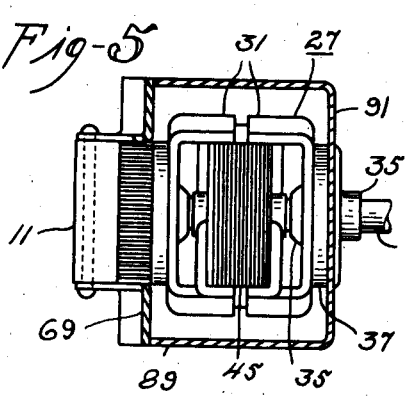
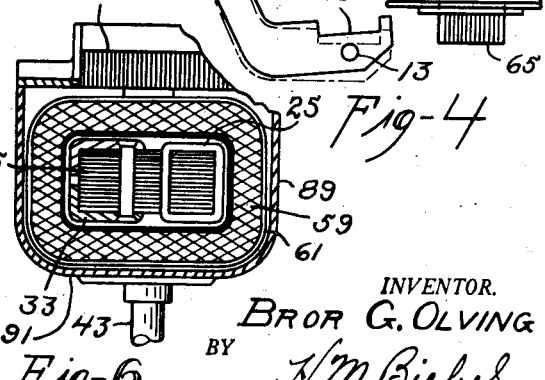
INVENTOR.
BROR G. OLVING
BY
H. M. Biebel
ATTORNEY

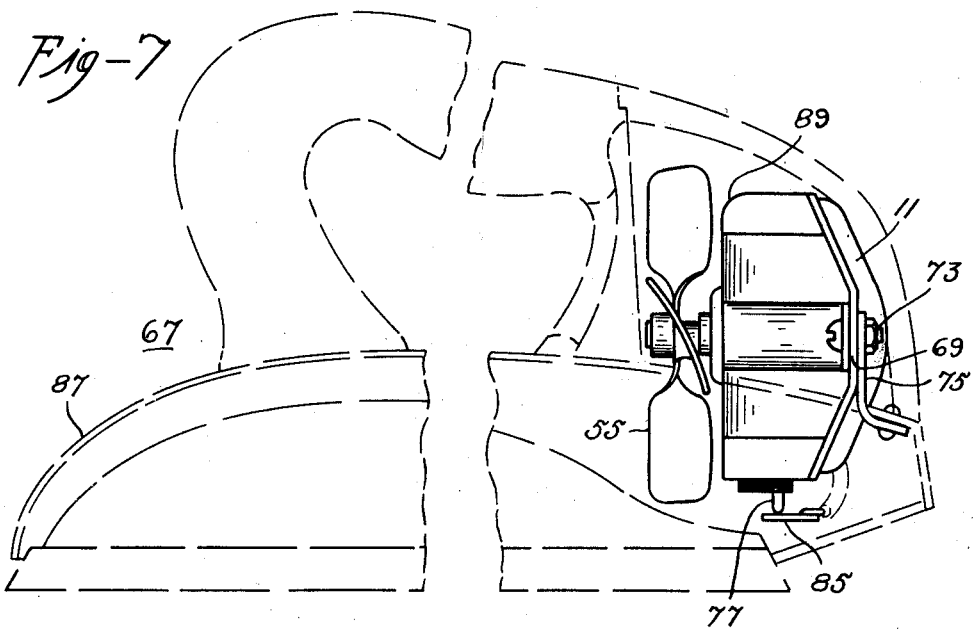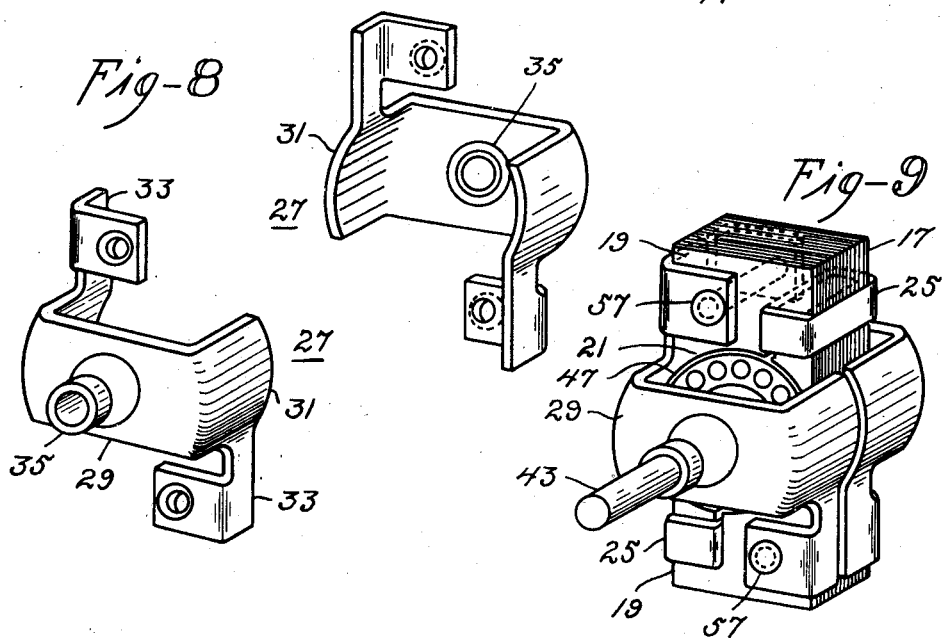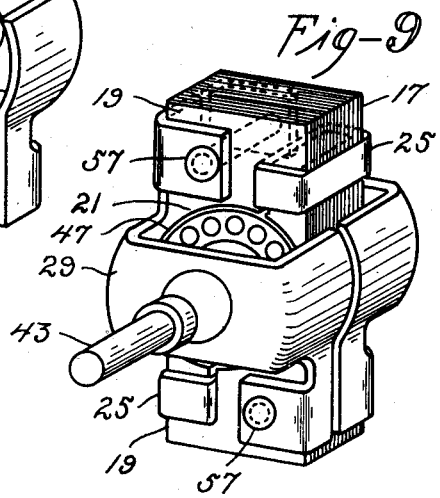

Patented Aug. 8, 1944

2,355,175

UNITED STATES PATENT OFFICE 2,355,175

ELECTRIC MOTOR

Bror G. Olving, Elgin, Ill., assignor to McGraw Electric Company, Elgin, Ill., a corporation of Delaware Application August 21, 1942, Serial No. 455,600

5 Claims. (Cl. 172—36)

My invention relates to electric motors and particularly to fractional horsepower motors.

An object of my invention is to provide a compact electric motor structure in which all of the parts are of minimum dimensions for the desired output.

Another object of my invention is to provide an electric motor assembly in which the energizing coils are so positioned that they overlap or overhang the adjacent part of the rotor air gap.

Another object of my invention is to provide a small electric motor in which the plane of the yoke laminations is the same as that of the axis of the motor shaft to reduce the width of the yoke structure laterally of the motor axis.

Another object of my invention is to provide a small electric motor having laminated yoke and stator structures held in proper operative positions relatively to each other by spring action of one of these parts on the other part.

Still another object of my invention is to provide a small compact electric motor structure in which the energizing coil structures are such as to result in a coil of substantially rectangular cross section whereby easy winding of the wire in the coil spool is possible.

Still another object of my invention is to provide a relatively simple cover for the motor to prevent lint or dust entering or lodging in the motor structure or the rotor air gap, particularly when the motor is used to operate fan blades mounted on the rotor shaft.

In the drawings,

Figure 1 is a sectional view on the line 1—1 of Fig. 2,

Fig. 2 is a sectional view thereof on the lines 2—2 of Fig. 1,

Fig. 3 is a sectional view on the line 3—3 of Figs. 1 and 2,

Fig. 4 is a side view of the yoke and of the stator structure shown in proper positions relatively to each other but in disassembled condition, Fig. 5 is a sectional view through a motor embodying my invention taken on the line 5—5 of Fig. 1 but with the energizing coil removed, Fig. 6 is a sectional view taken on the line 6—6 of Fig. 2, Fig. 7 shows an application of the motor particularly embodying my invention as applied to an electric iron, Fig. 8 is an exploded view of the two bearing supports, and, Fig. 9 shows a partially assembled view wherein the parts shown in Fig. 8 have been secured to the stator structure and with the rotor structure in proper operative position therein.

The motor embodying my invention was initially developed to drive a fan blade structure and to be mounted in or on a sadiron structure, all to be hereinafter referred to, but I desire to point out that the motor structure embodying my invention is not to be considered as being limited to this application since it may be used to operate or drive other devices where a relatively small fractional horsepower motor is required.

I provide a yoke structure 11 which comprises a plurality of laminated pieces of magnetic material such as sheet steel or iron, and these laminations are substantially of C-shape, as will be noted by reference to Figs. 1 and 4 of the drawings. I may provide elongated rivets 13 at the ends of the laminations as shown particularly in Figs. 1 and 3, in order to securely and tightly hold the laminations in closely adjacent positions relatively to each other, all as well known in the art. I wish to point out further that for a purpose to be hereinafter referred to in detail, the end portions of the yoke laminations are provided with a recess 15.

A stator structure comprises a plurality of laminations 17 of generally elongated shape, each of magnetic material such as sheet steel or iron. This stator structure embodies the usual shank portions, here two in number and designated by numerals 19, upon which energizing coils to be hereinafter referred to may be positioned and they also comprise pole piece portions 21 having webs 23 at each side thereof, of generally arcuate shape, and connecting the two pole piece portions 21, also in a manner now well known in the art.

I provide a shading coil 25, on each of the shank portions 19, being positioned relatively closely on or toward the pole piece portions 21, also in a manner well known in the art, in order to provide a self-starting motor when connected to a single phase energizing circuit.

Referring particularly to Figs. 8 and 9 of the drawings, I have there shown two substantially similar bearing brackets or bearing supports 27, each of which includes a central laterally projecting portion 29 and immediately adjacent thereto arcuate portions 31 having unitary therewith, clamping means 33. It is to be noted that a part of the clamping portions 33 extend substantially parallel with the intermediate portion 29, the portions 33 being of substantially L-shape in one section thereof.

Referring to Figs. 8 and 9 further, I have there shown a sleeve type bearing 35 which is held temporarily in its proper operative position in an opening in the mid portion 29 and is clamped in proper operative position in said opening by a bearing plate or bearing clamping plate 37, as shown in Figs. 1 and 3 of the drawings. The plate 37 may be held in proper operative position against the outside surface of the portion 29 by a plurality of short machine screws 39 and it is to be noted that a felt washer 41 is provided between the portion 29 and the plate 37 which is filled with oil and will provide lubrication for the sleeve bearing 35 particularly when the sleeve bearing 35 is of the so-called self-oiling type as now used in the art.

A rotor structure comprises a shaft 43 having mounted thereon a plurality of rotor laminations 45 each of circular outer periphery and of a diameter slightly less than the diameter of the rotor opening 47 in the stator structure. I may make the winding on the rotor laminations 45 in the shape of the usual skeleton-cage structure whereby a self-starting single phase rotor structure is provided. Any desired means of holding the rotor laminations on the shaft 43 may be provided and I provide blocks or stop members 51 and 53 at the respective sides of the rotor laminations, it being understood that these are for illustrative purposes only and that any other means well known in the art for the desired purpose may be used.

The stator structure, the rotor structure and the hereinbefore described bearing brackets may be assembled in proper sequence or order to obtain the stator and rotor structure shown (partially only) in Fig. 9 of the drawings, it being understood that the sleeve clamping plate 37 will be applied thereto in due order.

It is to be pointed out that the blocks 51 and 53 function also as means for centering the rotor in the stator structure or for positioning the rotor and the rotor shaft in the stator structure in any desired position as may be necessary when a set of fan blades 55 are mounted on the rotor shaft. It is, of course, well known that the movement of the air in a substantially axial direction of the rotor shaft by the fan blades will cause an unbalanced thrust and this may, if desired, be counter-balanced, at least to some extent, by positioning the rotor so that a magnetic pull by the stator is applied thereto, all as well known in the art.

Rivets 57 are individually applied to the end portions 33 hereinbefore described which rivets are effective to tightly clamp the end or outer end portions 19 of the stator structure 17 as well as to securely hold the members 27 in proper operative positions on the stator structure.

I have shown a pair of energizing coils 59 on the shanks 19 and it is to be noted that usual electric-insulating spools 61 are used to support the coil or winding in these spools which winding is effective to provide an alternating current flux, all as well known in the art. I wish to point out further that the inner edge or side 63 of the energizing coils overhang the adjacent part of the air gap between the pole pieces and the rotor laminations and it may be noted that this overhang of the coil relatively to the main or midportion of the air gap is effective to provide a short path for the flux traversing the rotor whereby I am able to obtain a greater torque for a given current and number of turns in the respective coil, that is, the ampere-turns in the energizing coils 59 will provide a greater flux because a part of the leakage flux which does not go through or traverse a part of the rotor structure in ordinary field or stator coils which do not overhang the air gap, are effective in my improved structure so that the effective torque is greater because of the overhang of the coil as to the rotor air gap.

I wish to point out also that substantially rectangular shaped energizing coils, in cross section, are possible in my structure which means that it is relatively simple to wind the coils since they are of substantially rectangular cross section.

I wish to point out also that the interfitting stator and yoke laminations extend at right angles to each other as regards the planes of the laminations and that the yoke structure 11 is forced or subjected to spreading means so that it is easy to have the surfaces 65 of the stator structure fit into the respective recesses 15. After removal of the spreading means or mechanism the ends of the yoke structure 11 will tightly engage with the surfaces 65 and be effective not only to provide a relatively good magnetic joint with small magnetic reluctance, but also to hold the two parts in the desired positions relatively to each other. The members 11 are shown in broken lines in the position they will occupy when assembled on the stator 17, the differences being exaggerated.

Referring now to Fig. 7 of the drawings, I have there shown, in broken lines, an electric iron 67 which it is desired to provide with a motor-driven fan preferably of the kind constituting my invention and it is, of course, desirable to provide supporting means for the motor in the iron 67. For this purpose I provide two motor-supporting bracket members 69, one at each side of the motor assembly as shown more particularly in Figs. 3 and 5 of the drawings. These brackets are of substantially L-shape in lateral section and have one portion thereof with a rounded edge as may be noted from Fig. 1 of the drawings and having the other portion of substantially wedge or triangular shape, as will be evident from Fig. 2 of the drawings. Openings 71 in the last named portions are provided through which a securing screw 73 may extend to clamp the motor against a motor supporting bracket 75 which may be secured in any suitable or desired manner to the structure of the iron 67. The brackets 69 may be secured to element 11 in any suitable or desired manner.

I provide further a pair of contact terminals 77 of pin or rod shape which extend through openings in the outer of a pair of plates 79 of electric-insulating material located at one end of the yoke structure, there being a small plate 81 secured to the inner end of pin 77 to be clamped by and between the two plates 79, which are held in proper operative position by rivets 83.

The electric iron 67 hereinbefore mentioned may be provided with a pair of preferably resilient contact bars 85 which are adapted to be energized at the same time as is the electric iron 67. It will be noted that the pins 77 will operatively and electrically engage the contact bars 85 when the motor is mounted in the desired and proper operative position in the electric iron by means of the clamping bolts 73 hereinbefore described.

When an electric motor having fan blades 55 mounted thereon is mounted in an electric iron for the purpose of causing a flow of air not only above the shell or housing 87 of the iron 67 but also below the shell or housing and when an iron of this type is used on ordinary cloth materials to iron the same, small pieces of lint will be detached by and during the ironing operation and it is, therefore, desirable to provide a cover for the electric motor and I provide such a cover 89 which may be of any suitable pressboard or plastic material now well known in the art since the temperatures to which the cover is subjected will not be relatively high. I may, of course, make the cover 89 of metal and the specific material forms no part of my invention. I wish to point out that the cover 89 has five sides and that the intermediate side wall 91 (see particularly Figs. 1 and 3) is provided with an opening centrally thereof through which either the shaft 43 or the right-hand sleeve bearing (as seen in Fig. 1) may extend. The cover 89 follows closely the external contour of the motor structure on all sides except that defined by the outer surface of the yoke member of substantially C-shape.

Motors of this kind have been tested in actual practice and the output thereof has been found to be relatively high as compared to the overall or the effective dimensions of the magnetic circuit of the motor which is, of course, an essential consideration when space for such an electric motor is at a premium as in an electric sadiron.

The device embodying my invention thus provides a relatively simple structure for an electric motor and as noted above, the operation of the motor embodying my invention has been found to be very good and that it will and does withstand the ordinary operating conditions to which a device of this kind may be subjected.

Various modifications may be made in the structure embodying my invention and all such modifications clearly coming within the scope of the appended claims are to be considered as being covered thereby.

I claim as my invention:

1. An electric motor assembly comprising a laminated yoke structure of substantially C-shape, a stator structure including a plurality of laminations, the planes of which extend at right angles to the planes of the yoke laminations, a rotor in said stator structure, a rotor shaft, bearing brackets for said shaft and rivets extending through the stator laminations and the bearing brackets to hold them in closely assembled relation.

2. An electric motor assembly comprising a laminated yoke structure of substantially C-shape having a recess in each end portion, a laminated stator structure including pole piece stampings having their inner ends joined by a web and having their outer ends fitting in the respective recesses in the end portions of the yoke structure to be held therein by spring action of the yoke structure, the laminations of the yoke structure extending at a right angle relatively to those of the stator structure, energizing coils on said pole piece stampings and a laminated rotor in said pole piece stampings, the energizing coils overhanging said rotor in the plane of said rotor laminations.

3. An electric motor assembly comprising a laminated yoke structure of substantially C-shape, a laminated stator structure including pole piece stampings having their inner ends joined by webs and having the outer ends interfitting with the respective end portions of the yoke, a pair of bearing brackets with their intermediate portions extending along and spaced from the side faces of the stator structure, clamping means for holding the end portions of the bearing brackets against the outer end portions of the stator structure and for holding the stator laminations in tightly assembled positions relatively to each other, a bearing retainer, of dished shape, secured to each of said bearing brackets and a self-alining bearing and an oil-retaining pad held by said bearing bracket and bearing retainer in proper operative position between said bearing bracket and bearing retainer.

4. An electric motor assembly comprising a laminated yoke structure of substantially C-shape, a laminated stator structure having its outer ends interfitting with the end portions of said yoke structure and having a rotor opening therein, a rotor structure rotatably supported by said stator structure, a pair of motor-supporting brackets, one at each side of the mid-portion of said yoke structure and rivets for simultaneously holding the mid-portion of said yoke laminations in tightly clamped positions relative to each other and for holding said motor-supporting brackets in proper operative position on the mid-portion of said yoke.

5. An electric motor assembly comprising a laminated yoke structure of substantially C-shape, a laminated stator structure having its outer ends interfitting with the end portions of said yoke structure and having a rotor opening therein, a rotor structure rotatably supported by said stator structure, energizing coils on said stator structure, a pair of terminal brackets at one end portion of said yoke member, a pair of plates of electric-insulating material held adjacent one end face of said yoke by said terminal brackets and contact terminals for said energizing coils supported by said plates of electric-insulating material and having a portion projecting through the outer of said plates of electric-insulating material.

BROR G. OLVING.